United States Patent
Yamamura et al.

(10) Patent No.: US 9,483,053 B2
(45) Date of Patent: Nov. 1, 2016

(54) ARRANGEMENT OF AREA WIRE FOR UNMANNED AUTONOMOUS OPERATING VEHICLE AND CONTROL APPARATUS OF THE SAME

(71) Applicant: HONDA MOTOR CO., LTD., Tokyo (JP)

(72) Inventors: Makoto Yamamura, Wako (JP); Toshiaki Kawakami, Wako (JP); Nobuyuki Habuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 13/761,591

(22) Filed: Feb. 7, 2013

(65) Prior Publication Data
US 2013/0211647 A1 Aug. 15, 2013

(30) Foreign Application Priority Data
Feb. 10, 2012 (JP) .................. 2012-027635

(51) Int. Cl.
*G05D 1/02* (2006.01)

(52) U.S. Cl.
CPC .......... *G05D 1/0225* (2013.01); *G05D 1/0265* (2013.01); *G05D 2201/0208* (2013.01)

(58) Field of Classification Search
None
See application file for complete search history.

(56) References Cited

U.S. PATENT DOCUMENTS 6,465,982 B1 * 10/2002 Bergvall et al. ............... 318/587
8,224,487 B2 * 7/2012 Yoo et al. ...................... 700/259
8,299,750 B2 * 10/2012 Pai ........................ H02J 7/0044 320/107
8,352,113 B2 * 1/2013 Johnson et al. ................ 701/26
8,392,044 B2 * 3/2013 Thompson et al. ............ 701/23
8,433,468 B2 * 4/2013 Johnson et al. ................ 701/23
8,549,826 B2 * 10/2013 Kraft et al. ................ 56/10.2 A
8,706,339 B2 * 4/2014 Thompson et al. ............ 701/23
8,725,316 B2 * 5/2014 Thompson et al. .............. 701/2

(Continued)

FOREIGN PATENT DOCUMENTS

| | | |
|---|---|---|
| EP | 2413215 | 2/2012 |
| WO | 01/56362 | 8/2001 |
| WO | 2005/074362 | 8/2005 |

OTHER PUBLICATIONS

European Search Report dated Jul. 25, 2013, Application No. 13154134.4, 8 pages.

(Continued)

*Primary Examiner* — Redhwan K Mawari
*Assistant Examiner* — Edward Torchinsky
(74) *Attorney, Agent, or Firm* — Rankin, Hill & Clark LLP (57) ABSTRACT

In an arrangement of an area wire for an unmanned autonomous operating vehicle having an electric motor supplied with power from a battery for operating an operating machine, and magnetic sensors for detecting intensity of a magnetic field of the area wire and controlled to run about in an operating area defined by the area wire to perform an operation using the operating machine and to return to a charging device installed on the area wire so as to charge the battery, there are provided with a charging device detecting area set to be used for detecting a position of the charging device, and a turn-back portion formed by bending the area wire at an appropriate position toward the charging device detecting area and again bending the area wire to return in a same direction with a predetermined space, whereby the operating area is divided into a plurality of zones.

10 Claims, 8 Drawing Sheets

(56) References Cited

U.S. PATENT DOCUMENTS

| | | |
|---|---|---|
| 2003/0023356 A1* | 1/2003 | Keable .......................... 701/23 |
| 2011/0234153 A1 | 9/2011 | Abramson |
| 2012/0029753 A1* | 2/2012 | Johnson et al. ............... 701/23 |
| 2012/0029754 A1* | 2/2012 | Thompson et al. ............ 701/23 |
| 2012/0029755 A1* | 2/2012 | Johnson ......................... 701/26 |
| 2013/0025248 A1* | 1/2013 | Kraft et al. ................ 56/10.2 A |
| 2013/0066484 A1* | 3/2013 | Markusson et al. .............. 701/2 |
| 2014/0058611 A1* | 2/2014 | Borinato ........................ 701/23 |

OTHER PUBLICATIONS

Korean Office Action dated Apr. 29, 2014 with English Translation, 8 pages.

\* cited by examiner

ARRANGEMENT OF AREA WIRE FOR UNMANNED AUTONOMOUS OPERATING VEHICLE AND CONTROL APPARATUS OF THE SAME

BACKGROUND

1. Technical Field

An embodiment of the invention relates to an arrangement of an area wire for an unmanned autonomous operating vehicle and a control apparatus of the vehicle, particularly to an arrangement of an area wire defining an operating area of an unmanned autonomous operating vehicle configured to run about in the operating area to perform an operation using a mounted operating machine and an apparatus for controlling the vehicle.

2. Background Art

Conventionally, there are proposed a variety of unmanned autonomous operating vehicles that autonomously run about in operating areas to perform operations using mounted operating machines such as lawn-mowing blades, as taught, for example, by International Publication No. WO 2005/074362.

In the reference, a magnetic sensor attached to a front end of an operating vehicle detects the intensity of a magnetic field of an area wire laid along a border of an operating area to recognize the operating area, and a mounted operating machine including lawn-mowing blades and installed with an electric motor is driven to perform the operation in the recognized operating area.

The motor of the vehicle in the technique stated in the reference is supplied with power from a mounted battery. In order to charge the battery, a charging device is disposed on the area wire and when the remaining battery level is decreased, the vehicle is controlled to follow the area wire by the aid of the magnetic sensor to return to the charging device along the area wire.

SUMMARY

The vehicle disclosed in the reference is configured to detect the area wire and follow the area wire to return to the charging device when the remaining battery level is decreased as mentioned above. In this case, if the detected point (location) of the area wire is positioned immediately behind the charging device (in the running direction of the vehicle along the area wire), it results in a longer running distance to the charging device. Since the battery level is low so that the vehicle needs to return early, the longer running distance adversely affects its work efficiency.

To cope with it, it is disclosed a technique to lay, in addition to the area wire, a guide wire in the operating area to divide the operating area into several parts to shorten the running distance to the charging device. However, since the guide wire must be provided in addition to the area wire, the structure becomes complicated and it also increases the cost, disadvantageously.

An object of an embodiment of the invention is therefore to overcome the foregoing drawback by providing an arrangement of an area wire for an unmanned autonomous operating vehicle and a control apparatus of the vehicle, the apparatus having an electric motor supplied with power from a battery to drive an operating machine to perform an operation, and the arrangement enabling to shorten a running distance of the vehicle to a charging device to charge the battery with the simple structure, thereby improving the work efficiency.

In order to achieve the object, the embodiment of the invention provides in the first aspect an arrangement of an area wire for an unmanned autonomous operating vehicle having an electric motor supplied with power from a battery for operating an operating machine, prime movers for driving wheels, and magnetic sensors for detecting intensity of a magnetic field of the area wire, the vehicle being controlled to run about in an operating area defined by the area wire through wheels driven by the prime movers to perform an operation using the operating machine and to return to a charging device installed on the area wire so as to charge the battery, wherein the improvement comprises: a charging device detecting area set to be used for detecting a position of the charging device; and a turn-back portion formed by bending the area wire at an appropriate position toward the charging device detecting area and again bending the area wire to return in a same direction with a predetermined space, whereby the operating area is divided into a plurality of zones.

In order to achieve the object, the embodiment of the invention provides in the second aspect an apparatus for controlling an unmanned autonomous operating vehicle having an electric motor supplied with power from a battery for operating an operating machine, prime movers for driving wheels, and magnetic sensors for detecting intensity of a magnetic field of an area wire, the vehicle being controlled to run about in an operating area defined by the area wire through wheels driven by the prime movers to perform an operation using the operating machine and to return to a charging device installed on the area wire so as to charge the battery, wherein the improvement comprises: a charging device detecting area set to be used for detecting a position of the charging device; a turn-back portion formed by bending the area wire at an appropriate position toward the charging device detecting area and again bending the area wire to return in a same direction with a predetermined space; and a returning controller adapted to control the vehicle to turn about when the vehicle is determined to have reached the charging device detecting area and subsequently run toward the area wire to be guided to the charging device when the vehicle is to be returned to the charging device.

BRIEF DESCRIPTION OF DRAWINGS

The above and other objects and advantages will be more apparent from the following description and drawings in which.

DESCRIPTION OF EMBODIMENT

An arrangement of an area wire for an unmanned autonomous operating vehicle and a control apparatus of the vehicle according to an embodiment of the present invention will now be explained with reference to the attached drawings.

Figure 1:
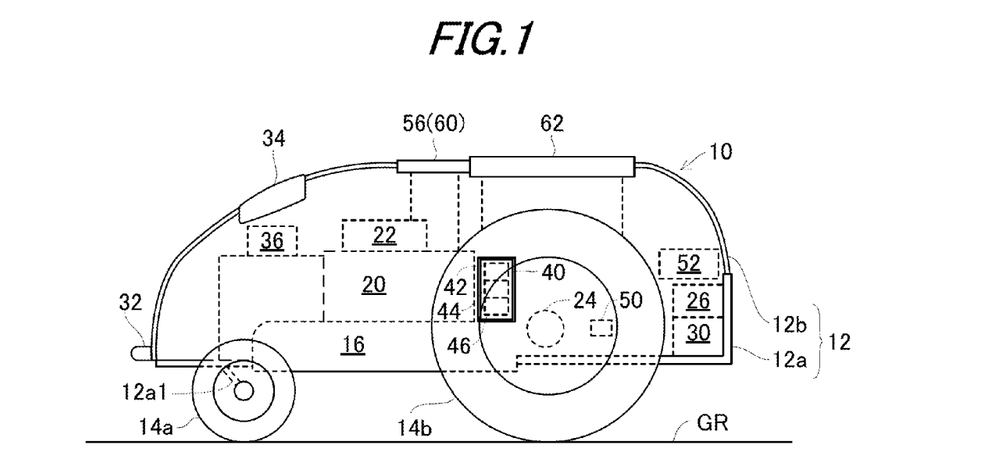
FIG. 1 is a side view of a control apparatus of an unmanned autonomous operating vehicle according to an embodiment of the invention.
Figure 2:
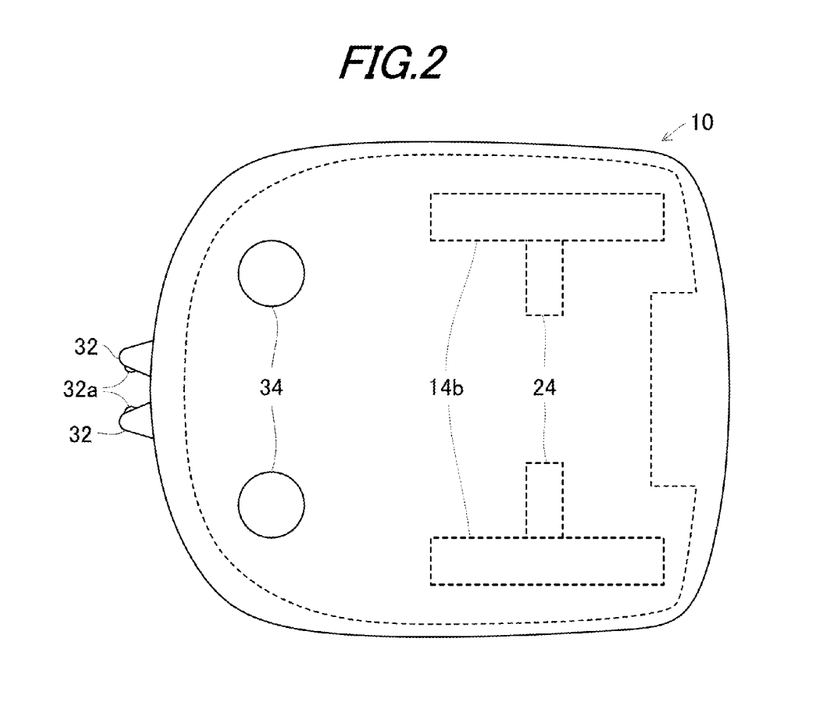
FIG. 2 is a plan view of the vehicle shown in FIG. 1.
Figure 3:
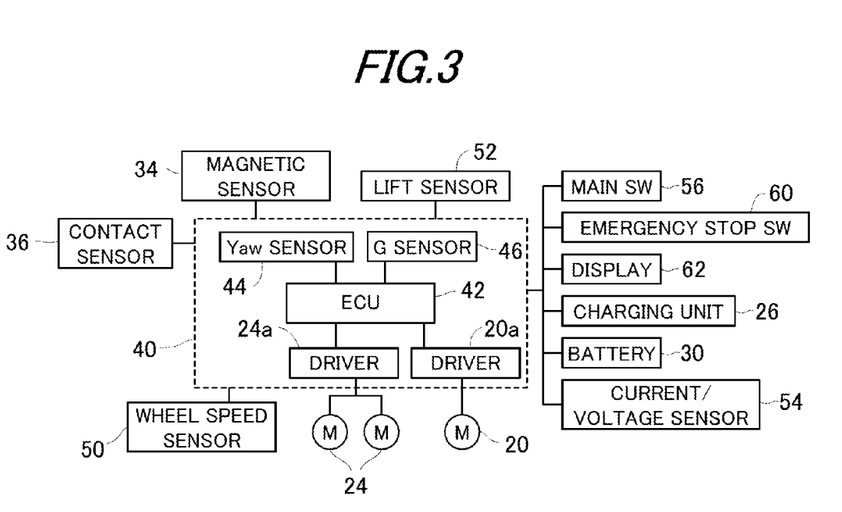
FIG. 3 is a block diagram showing input and output of devices mounted on the vehicle shown in FIG. 1.
Figure 4:
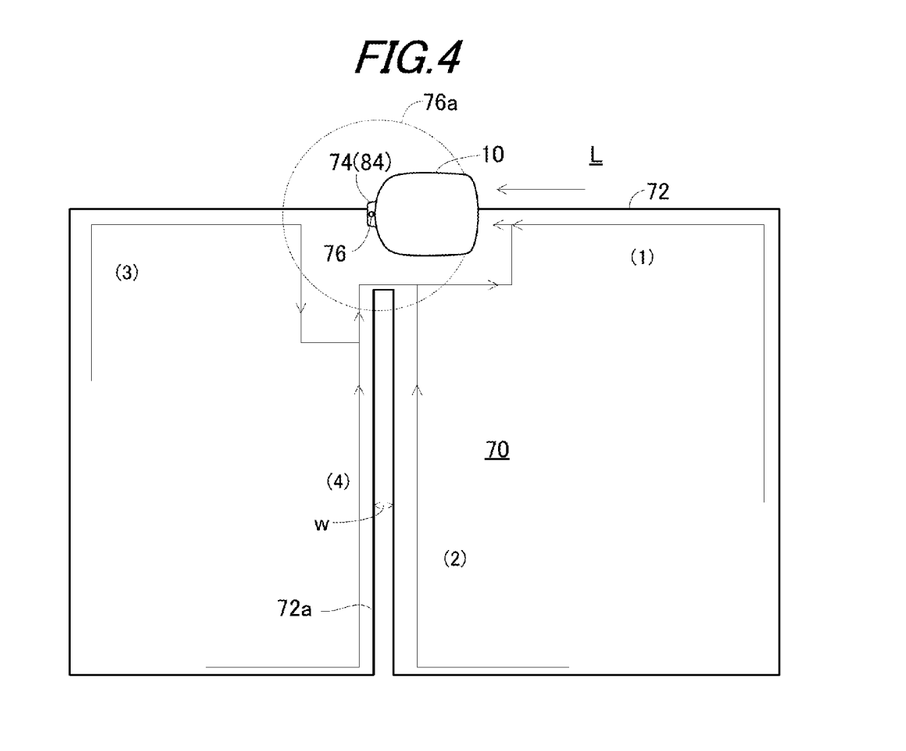
FIG. 4 is a plan view showing an operating area where the vehicle shown in FIG. 1 is to be run about.

FIG. 1 is a side view of a control apparatus of an unmanned autonomous operating vehicle according to an embodiment of the invention, FIG. 2 is a plan view of the vehicle shown in FIG. 1, FIG. 3 is a block diagram showing input and output of devices mounted on the vehicle shown in FIG. 1 and FIG. 4 is a plan view showing an operating area where the vehicle shown in FIG. 1 is to be run about.

As shown in FIGS. 1 and 2, symbol 10 indicates an unmanned autonomous operating vehicle. The vehicle 10 has a vehicle body 12 and wheels 14. The body 12 includes a chassis 12a and a frame 12b attached to the chassis 12a, while the wheels 14 include right and left front wheels 14a of a relatively small diameter that are fixed on the forepart of the chassis 12a through a stay 12a1, and right and left rear wheels 14b of a relatively large diameter that are directly attached to the chassis 12a.

Blades (rotary blades; operating machine) 16 for mowing lawn are attached in the center or thereabout of the chassis 12a, and an electric motor (hereinafter called the "operating motor") 20 is installed above the blades 16. The blades 16 are connected to the operating motor 20 to be driven and rotated thereby.

The blades 16 are also connected to a blade height adjustment mechanism 22 to be manually manipulated by an operator (user). The blade height adjustment mechanism 22 is equipped with a screw (not shown) to be manually turned by the operator for adjusting the height of the blades 16 from a contacting ground GR.

Two electric motors (prime movers; hereinafter called the "running motors") 24 are attached to the chassis 12a of the vehicle 10 to the rear of the blades 16. The running motors 24 are connected to the right and left rear wheels 14b to operate them so that the rear wheels 14b are rotated in the normal (forward running) direction or reverse (backward running) direction independently of each other to make the vehicle 10 to run on the ground GR. In other words, the front wheels 14a serve as the free wheels while the rear wheels 14b serve as the driven wheels. The blades 16, operating motor 20, running motors 24, etc., are covered by the frame 12b.

A charging unit (including an AC/DC converter) 26 and battery 30 are accommodated at the rear of the vehicle 10 and two charging terminals 32 are attached to the frame 12b at the front of the vehicle 10 to protrude forward to be connectable with the charging device. Each of the terminals 32 has a contact point 32a on a side facing the other contact point 32a.

The terminals 32 are connected to the charging unit 26 through wiring and the charging unit 26 is connected to the battery 30 through wiring. The operating and running motors 20, 24 are connected to the battery 30 through wiring to be supplied with power therefrom. The wiring is not illustrated in FIGS. 1 and 2.

Thus, the vehicle 10 is constituted as a four-wheel, unmanned, electric autonomous operating vehicle (lawn-mowing vehicle) that is, for instance, about 600 millimeters long, 300 millimeters wide and 300 millimeters high.

A front end of the vehicle 10 is installed with two, i.e., right and left magnetic sensors (magnetism detector) 34. The frame 12b is attached with a contact sensor 36. When the frame 12b comes off from the chassis 12a upon having contact with an obstacle and such, the contact sensor 36 outputs an ON signal.

A housing box is provided in the center or thereabout of the vehicle 10 to house a board 40 on which an Electronic Control Unit (ECU; Controller) 42 including a microcomputer having a CPU, ROM, RAM, etc., is installed. The board 40 is also installed in the vicinity of the ECU 42 with a Yaw sensor (angular velocity sensor) 44 that produces an output or signal indicative of angular velocity (yaw rate) generated about a z-axis in the center of gravity of the vehicle 10 and with a G sensor (acceleration sensor) 46 that produces an output or signal indicative of an acceleration G acting on the vehicle 10 in the X, Y and Z (three-axis) directions.

A wheel speed sensor 50 is installed near the rear (driven) wheel 14b to produce an output or signal representing a wheel speed thereof. A lift sensor 52 is installed between the chassis 12a and frame 12b to output an ON signal when the frame 12b is lifted from the chassis 12a by the operator or the like.

A current/voltage sensor 54 is installed at the battery 30 to produce an output or signal indicative of SOC (State Of Charge) of the battery 30. The vehicle 10 is installed with a main switch 56 and emergency stop switch 60 to be manipulated by the operator.

The outputs of the foregoing magnetic sensors 34, contact sensor 36, Yaw sensor 44, G sensor 46, wheel speed sensor 50, lift sensor 52, current/voltage sensor 54, main switch 56 and emergency stop switch 60 are sent to the ECU 42.

The upper surface of the frame 12b of the vehicle 10 is widely cut away and a display 62 is installed therein. The display 62 is connected to the ECU 42 to show a mode of the vehicle's status such as an operating mode in response to a command sent from the ECU 42.

Next, the explanation will be made on the operating area 70 where the vehicle 10 is to be run about. As shown in FIG. 4, the operating area 70 has a substantially-rectangular shape and is defined by an area wire (electric wire) 72 that is embedded (laid) along a border of land L. A charge ST (station) 74 is provided on the area wire 72. Note that the vehicle 10 in FIG. 4 is exaggerated in size.

The charge ST 74 is disposed with an ST coil 76. A magnetic field radiated from the ST coil 76 forms a charging device detecting area 76a of a circle with center at the charge ST 74 with a radius of about one meter. Thus, the charge ST (charging device) 74 is disposed with the coil 76 radiating the magnetic field that forms a charging device detecting area around the charge ST 74.

Figure 5:
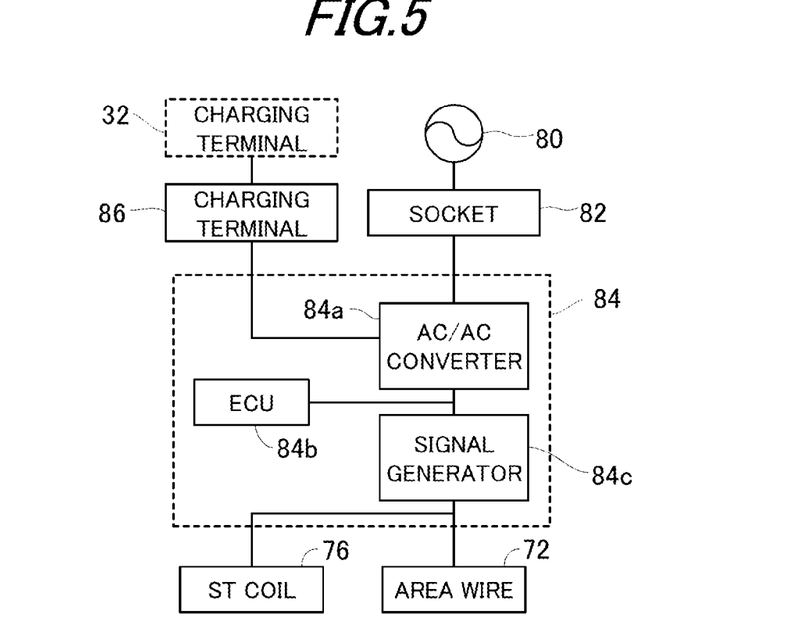
FIG. 5 is a block diagram showing the configuration of the charge ST (station) shown in FIG. 4.
Figure 6:
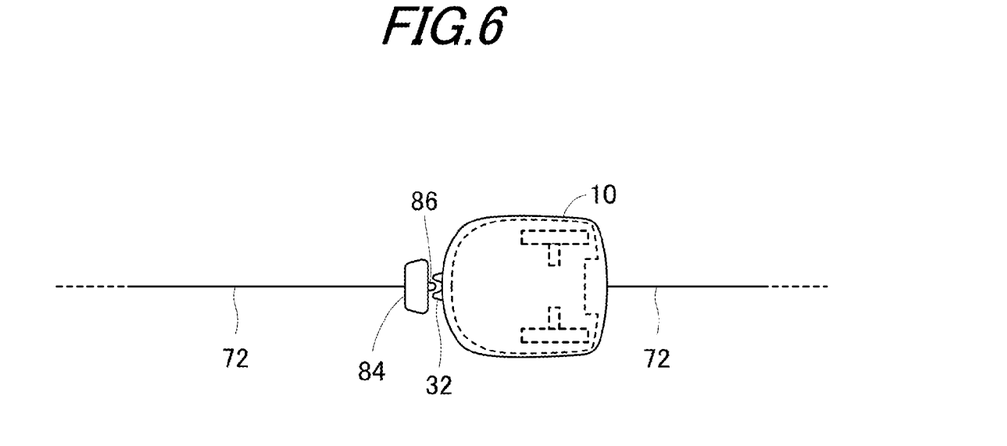
FIG. 6 is an explanatory view showing a charging process at the charge ST shown in FIG. 5.

As shown in FIG. 5, the charge ST 74 has a charging device 84 connected to a commercial power source 80 through a socket 82, and a charging terminal 86 that is connected to the charging device 84 and connectable to the contact points 32a of the charging terminals 32 of the vehicle 10 through its contact points. The charging terminal 86 is shown in FIG. 6 (the contact points thereof are not illustrated).

The charging device 84 has an AC/AC converter 84a, an Electronic Control Unit (ECU) 84b that includes a microcomputer similarly to the ECU 42 and controls the operation of the AC/AC converter 84a, and a signal generator 84c that supplies alternating current to the area wire 72 and ST coil 76 to generate signals.

Alternating current coming from the commercial power source 80 through the socket 82 is appropriately stepped down by the AC/AC converter 84a of the charging device 84 and, when the vehicle 10 is returned and connected to the charge ST 74 through the charging terminals 32 and 86, the current is sent to the vehicle 10 to charge the battery 30 through the charging unit 26.

As shown in FIG. 4, the area wire 70 is bent at an appropriate position, i.e., a position greatly apart from the charge ST 74 on the opposite side from the charge ST 74, and again bent to return in the same direction with a predetermined space (or distance) w. In other words, a turn-back portion 72a is formed at the area wire 70, whereby the operating area 70 is divided into a plurality of zones, i.e., two (right and left) zones in the illustrated example. It is thus-configured to shorten a running distance of the vehicle 10 when it is returned to the charging device 84 to charge the battery 30.

The operation of detecting the operating area 70 will be explained. Upon power supply from the signal generator 84c, a magnetic field is generated around the area wire 72. The intensity of the magnetic field varies depending on the entire length of the area wire 72 and also varies depending on a distance d from the area wire 72 as shown in FIG. 7.

The intensity of the magnetic field of the area wire 72 is detected by the magnetic sensors 34 attached to the vehicle 10 and sent to the ECU 42. Based on the detected values, the ECU 42 detects a position of the subject vehicle (autonomous operating vehicle 10) with respect to the area wire 72 (i.e., whether the subject vehicle is positioned inside or outside the operating area 70) and the distance of the subject vehicle from the area wire 72 (i.e., from the border of the operating area 70).

Figure 7:
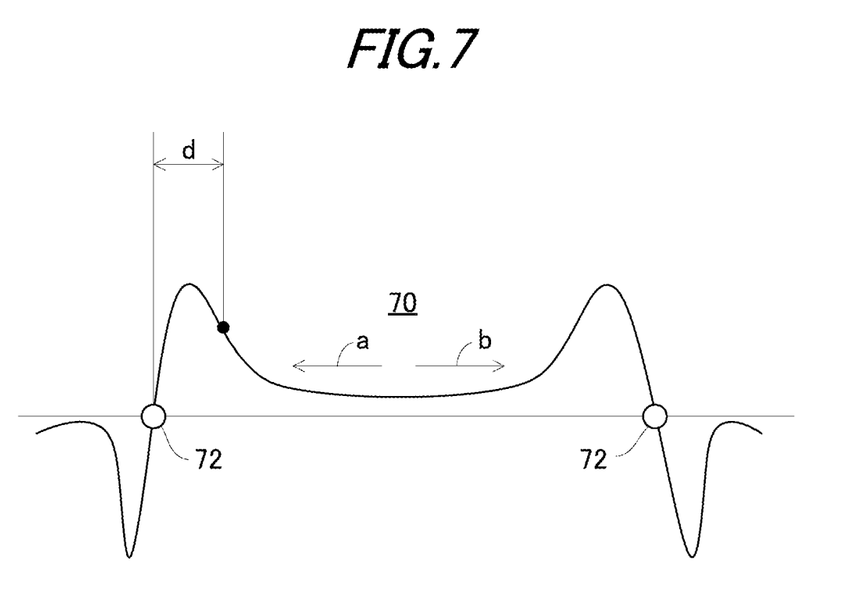
FIG. 7 is an explanatory view showing a magnetic field of an area wire embedded in the operating area shown in FIG. 4.

More specifically, as shown in FIG. 7, when the subject vehicle is moved from the inside of the operating area 70 to the outside thereof in a direction indicated by an arrow a, as the distance from the area wire 72 is reduced (as the subject vehicle is moved closer to the area wire 72), the intensity of the magnetic field is gradually increased on a positive side and afterward, decreased. When the subject vehicle is positioned on the area wire 72, the intensity becomes zero. Subsequently, when the distance from the area wire 72 is again increased, the intensity exhibits the similar characteristics on a negative side. Also when the subject vehicle is moved from the inside of the operating area 70 to the outside thereof in a direction indicated by an arrow b, the characteristics similar to the above pattern are exhibited.

In FIG. 4, the predetermined space w at the turn-back portion 72a of the area wire 72 is determined based on the intensity of the magnetic field of the area wire 72. Specifically, in order to avoid a situation where the magnetic fields at two close points of the area wire 72 are canceled out and become undetectable, the predetermined space w is appropriately set, e.g., set to 200 millimeters.

The operation of the vehicle 10 will be explained. The height of the blades 16 is manually adjusted by the operator through the blade height adjustment mechanism 22 in accordance with a growing condition of the lawn in the operating area 70. When the main switch 56 is switched on so that the ON signal is outputted, the ECU 42 starts to be operated and enters the operating mode to mow the lawn.

In the operating mode, the ECU 42 calculates a power supply control value with which a vehicle speed detected from the output of the wheel speed sensor 50 becomes a predetermined value and supplies the calculated value to the running motors 24 through a driver 24a to make the vehicle 10 run about. Further, the ECU 42 calculates a power supply control value with which rotational speeds of the blades 16 become a predetermined value and supplies the calculated value to the operating motor 20 through a driver 20a to operate the blades 16 to perform the operation.

To be more specific, in the operating mode, the ECU 42 makes the vehicle 10 run about randomly to perform the operation within the operating area 70. When determining that the vehicle 10 has moved out of the operating area 70 based on the outputs of the magnetic sensors 34, the ECU 42 changes a running direction detected based on the output of the Yaw sensor 44 by a predetermined angle so that the vehicle 10 comes back to the inside of the operating area 70.

Since the right and left rear (driven) wheels 14b are configured so that they are driven by the running motors 24 to rotate in the normal and reverse directions independently or separately from each other, when the motors 24 are rotated in the normal direction at the same speed, the vehicle 10 runs straight, whilst when they are rotated in the normal direction at different speeds, the vehicle 10 is turned toward a side of lower rotational speed. When one of the motors 24 is rotated in the normal direction and the other is rotated in the reverse direction, since the rear wheels 14b are rotated in the same direction as the associated motor's rotation, the vehicle 10 is turned at the same position (which is so-called pivot turn).

Thus, in the operating mode, the ECU 42 makes the vehicle 10 run about within the operating area 70 while changing the running direction thereof randomly whenever the vehicle 10 reaches the area wire 72, and drives the blades 16 to perform the operation.

Further, in the operating mode, the ECU 42 monitors the SOC of the battery 30 based on the output of the current/voltage sensor 54 and when the remaining battery level is decreased to a predetermined level, transitions to a return mode in which the vehicle 10 is returned to the charge ST 74 to charge the battery 30 by the charging device 84. Returning trajectories (or routes) (1) to (4) to follow in the return mode are shown in FIG. 4. Note that those trajectories (1) to (4) are only examples and a variety of trajectories other than those can be applied in accordance with the situation.

Further, an entering direction of the vehicle 10 to the charge ST 74 is alternately changed between a CW (Clockwise) and CCW (Counterclockwise), as viewed from above of the operating area 70 (shown in FIG. 4), whenever the vehicle 10 is returned. It is carried out by setting an appropriate flag in the RAM of the ECU 42.

In the operating mode and return mode, when any of the contact sensor 36, lift sensor 52 and emergency stop switch 60 produces the ON signal, the ECU 42 stops the operating and running motors 20, 24 to stop the operation and running of the vehicle 10.

FIGS. 8 to 11 are flowcharts showing operations of the ECU 42, i.e., operations (controls) corresponding to the returning trajectories (1) to (4) shown in FIG. 4.

Figure 8:
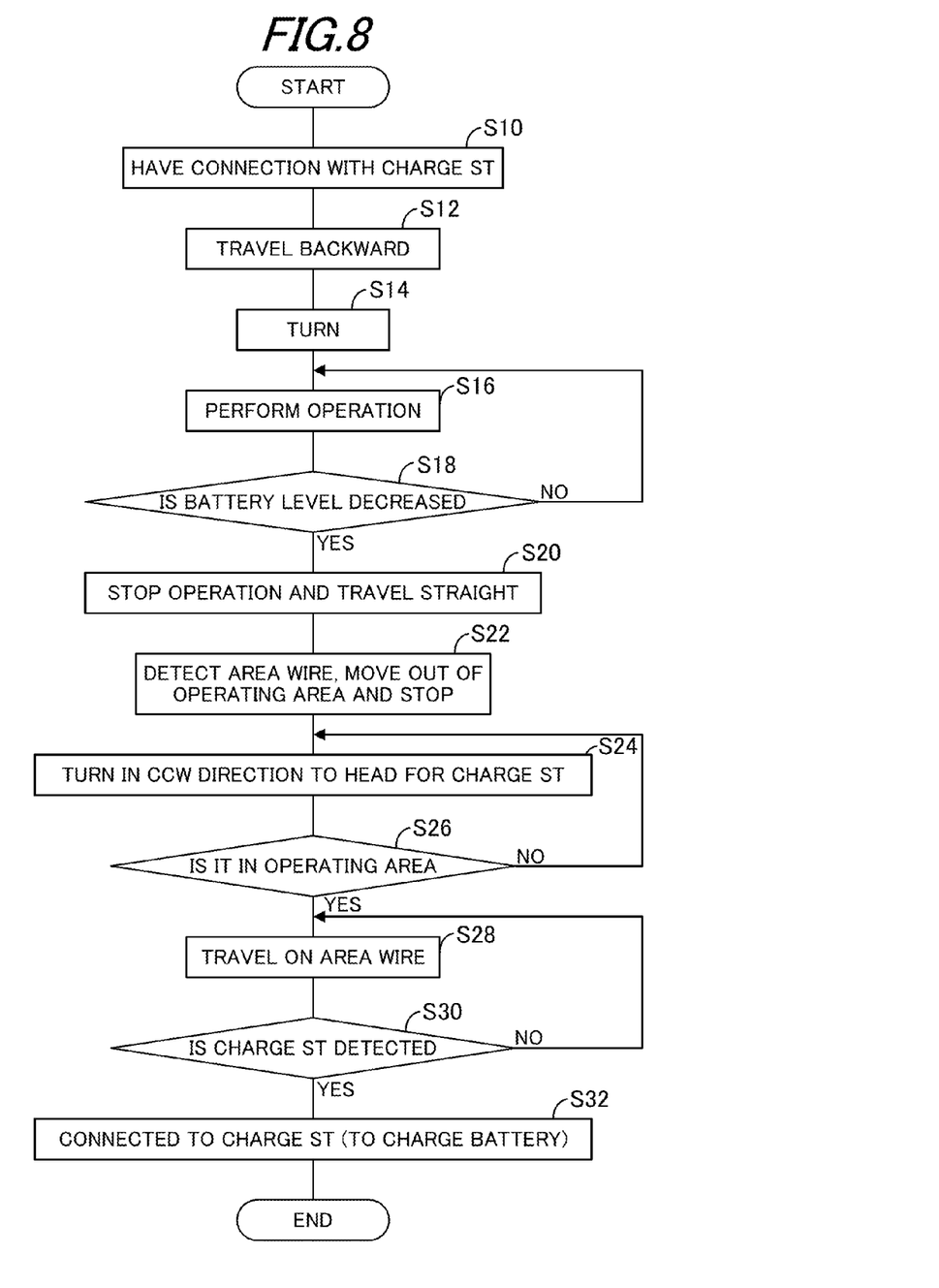
FIG. 8 is a flowchart showing the operation of the apparatus shown in FIG. 1, i.e., the operation in the case of applying a returning trajectory (1) shown in FIG. 4.

FIG. 8 is a flowchart corresponding to the returning trajectory (1).

This program begins under a condition where the vehicle 10 has a connection with the charging device 84 at the charge ST 74 to charge the battery 30 (S10). When the battery 30 has been fully charged, the vehicle 10 is run backward and turned about (S12, S14), and the status is changed to the operating mode in which the vehicle 10 is run about within the operating area 70 randomly (or in accordance with an operation pattern) to mow the lawn (S16). It is determined whether the remaining battery level of the battery 30 is decreased (i.e., becomes equal to or less than the predetermined level) (S18) and until the remaining battery level is determined to have been decreased, the mowing operation is continued (S16, S18).

In the operating mode, the ECU 42 operates the motors 24 to drive the wheels 14 to run about the vehicle 10 in the operating area 70, while operating the motor 20 to drive the blades 16 to perform the operation. The ECU 42 determines the turn-back portion 72a of the area wire 72 as the inside, outside and inside of the operating area 70, based on the outputs of the magnetic sensors 34.

At that time, in the operating mode, the ECU 42 compares a time period that the vehicle 10 is determined to be in the outside of the operating area 70 with an appropriate threshold value, so as to control the vehicle 10 to just go across the turn-back portion 72a, thereby avoiding affecting the mowing operation.

When the remaining battery level is determined to be decreased to the predetermined level in S18, the mowing operation is stopped, the running motors 24 are controlled to run the vehicle 10 straight (S20), the area wire 72 is detected based on the outputs of the magnetic sensors 34, and the vehicle 10 is moved out of the operating area 70 and stopped (S22).

In the case of applying the trajectory (1), since the entering direction of the vehicle 10 when it is returned to the charge ST 74 is set as the CCW, the vehicle 10 is restarted to turn in counterclockwise (CCW) direction (S24), and the above process is repeated until it is confirmed that the vehicle 10 has come inside the operating area 70 (S26).

Next, based on the detected magnetic field intensity of the area wire 72, the operations of the running motors 24 are controlled to run the vehicle 10 on the area wire 72 (S28). Specifically, based on the outputs of the magnetic sensors 34, the ECU 42 controls amounts of power to be supplied to the running motors 24 using a feedback control law such as a proportional term so that a front portion of the vehicle 10 is slightly shaken right and left to be positioned inside and outside the operating area 70 alternately, thereby controlling the vehicle 10 to run on or along the area wire 72.

Next, it is determined whether the charge ST 74, i.e., the charging device detecting area 76a is detected by detecting the magnetic field of low intensity generated from the ST coil 76 using the magnetic sensors 34 and comparing it with an appropriate threshold value (S30). Whenever the result in S30 is negative, the program returns to S28 to repeat the foregoing process.

When the result in S30 is affirmative, the running speed is decreased and the vehicle 10 is controlled to enter the charge ST 74 in the CCW direction, whereby the charging terminals 32 of the vehicle 10 are connected to the charging terminal 86 to charge the battery 30 (S32).

Figure 9:
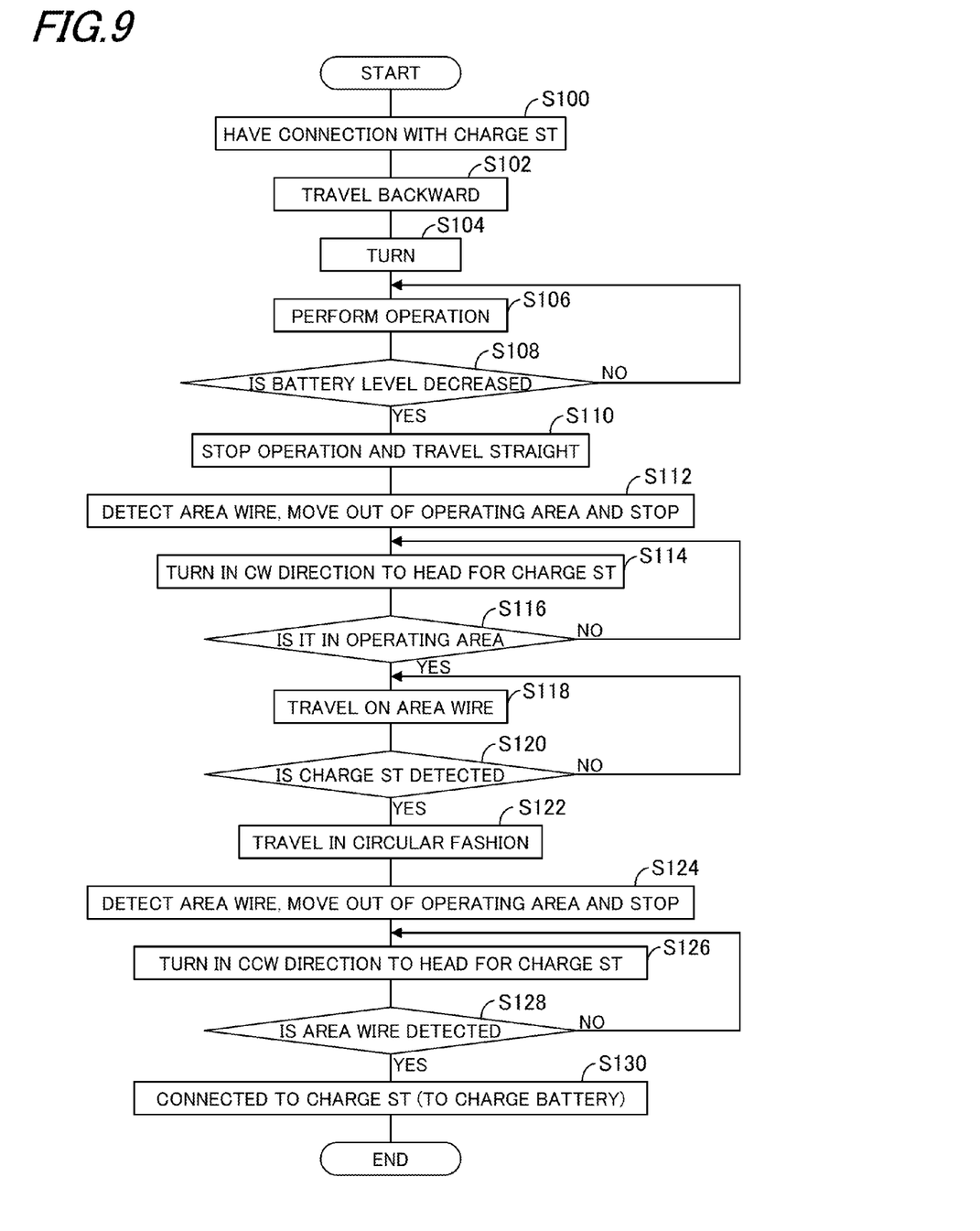
FIG. 9 is a flowchart showing the operation of the apparatus shown in FIG. 1, i.e., the operation in the case of applying a returning trajectory (2) shown in FIG. 4.

FIG. 9 is a flowchart corresponding to the returning trajectory (2) shown in FIG. 4.

The processes of S100 to S116 are conducted similarly to those of S10 to S30 in the FIG. 8 flowchart. As shown in FIG. 4, in the case of applying the trajectory (2), the entering direction of the vehicle 10 when it is returned to the charge ST 74 is set as the CW.

Next, based on the outputs of the magnetic sensors 34, the magnetic field intensity of the area wire 72 is detected, and based on the detected intensity, the operations of the running motors 24 are controlled to run the vehicle 10 on the area wire 72 until the charge ST 74 is detected (S118, S120). Here, the running on the area wire 72 in S118 means the running on or along the turn-back portion 72a.

When the charge ST 74 is determined to be detected, the vehicle 10 is turned in the CW direction (run in a circular fashion) as indicated by the trajectory (2) in FIG. 4 (S122), the area wire 72 is detected based on the outputs of the magnetic sensors 34, and the vehicle 10 is moved out of the operating area 70 and stopped (S124).

Then, as indicated by the trajectory (2) in FIG. 4, the vehicle 10 is turned in the CCW direction until the area wire 72 is detected (S126, S128). When the area wire 72 is detected, the vehicle 10 is run on the area wire 72 and, subsequently, when the charge ST 74 is detected, the running speed is decreased and the vehicle 10 is controlled to enter the charge ST 74 in the CCW direction, whereby the charging terminals 32 of the vehicle 10 are connected to the charging terminal 86 to charge the battery 30 (S130).

Figure 10:
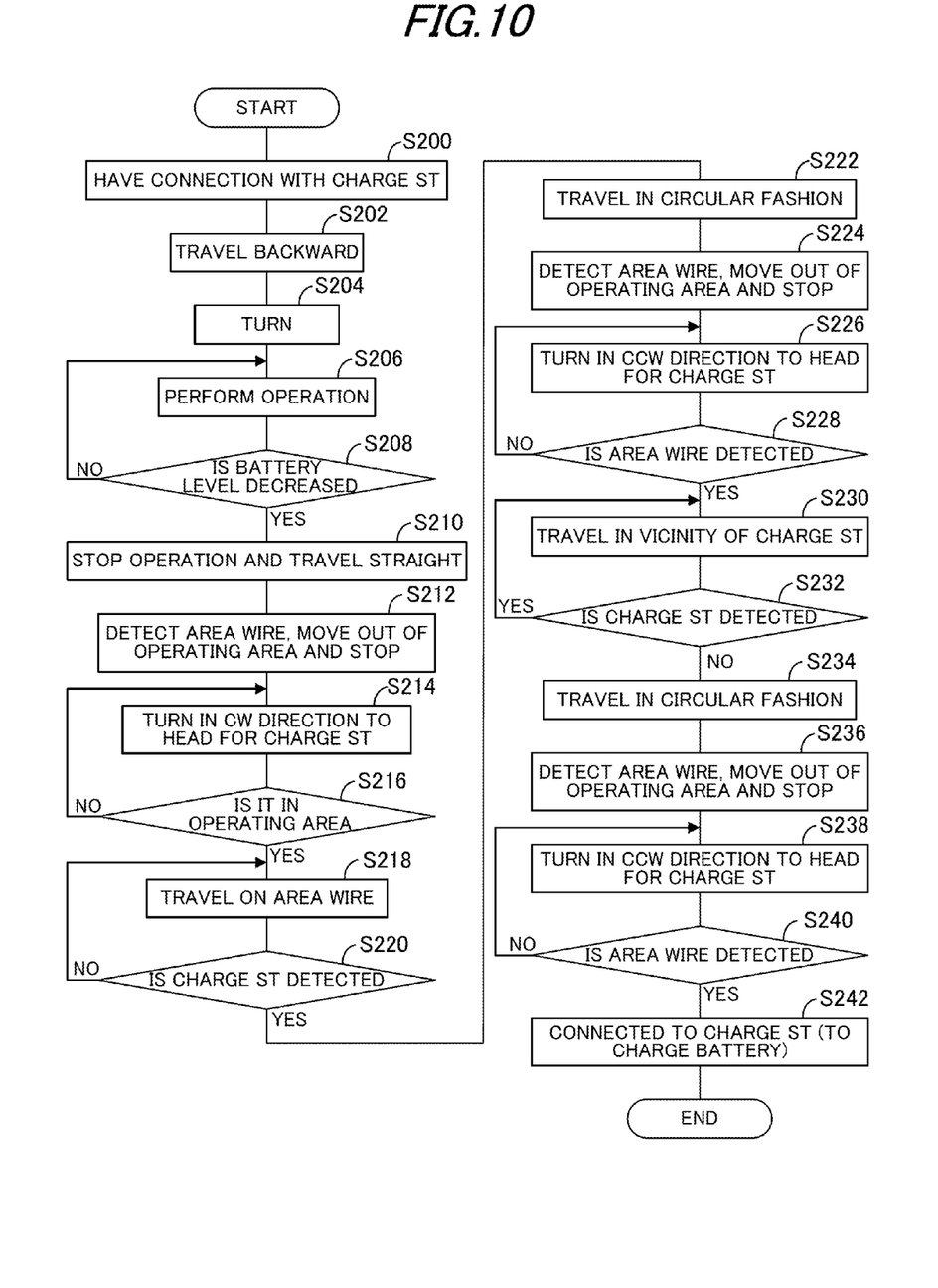
FIG. 10 is a flowchart showing the operation of the apparatus shown in FIG. 1, i.e., the operation in the case of applying a returning trajectory (3) shown in FIG. 4.

FIG. 10 is a flowchart corresponding to the returning trajectory (3) shown in FIG. 4.

The processes of S200 to S228 are conducted similarly to those of S110 to S128 in the FIG. 9 flowchart. Upon detecting the area wire 72, the vehicle 10 is run on the area wire 72 positioned in the vicinity of the charge ST 74 until the charge ST 74 is detected (S230). Here, the running on the area wire 72 in S230 means the running on or along the turn-back portion 72a. As shown in FIG. 4, in the case of applying the trajectory (3), the entering direction of the vehicle 10 when it is returned to the charge ST 74 is set as the CW.

When the charge ST 74 is determined to be detected, the vehicle 10 is turned about (run in the circular fashion) in the CCW direction as indicated by the trajectory (3) in FIG. 4 (S234), the area wire 72 is detected based on the outputs of the magnetic sensors 34, and the vehicle 10 is moved out of the operating area 70 and stopped (S236).

Then, the vehicle 10 is turned in the CCW until the area wire 72 is detected (S238, S240). When the area wire 72 is detected, the vehicle 10 is run on the area wire 72 and, subsequently, when the charge ST 74 is detected, the running speed is decreased and the vehicle 10 is controlled to enter the charge ST 74 in the CCW direction, whereby the charging terminals 32 of the vehicle 10 are connected to the charging terminal 86 to charge the battery 30 (S242).

Figure 11:
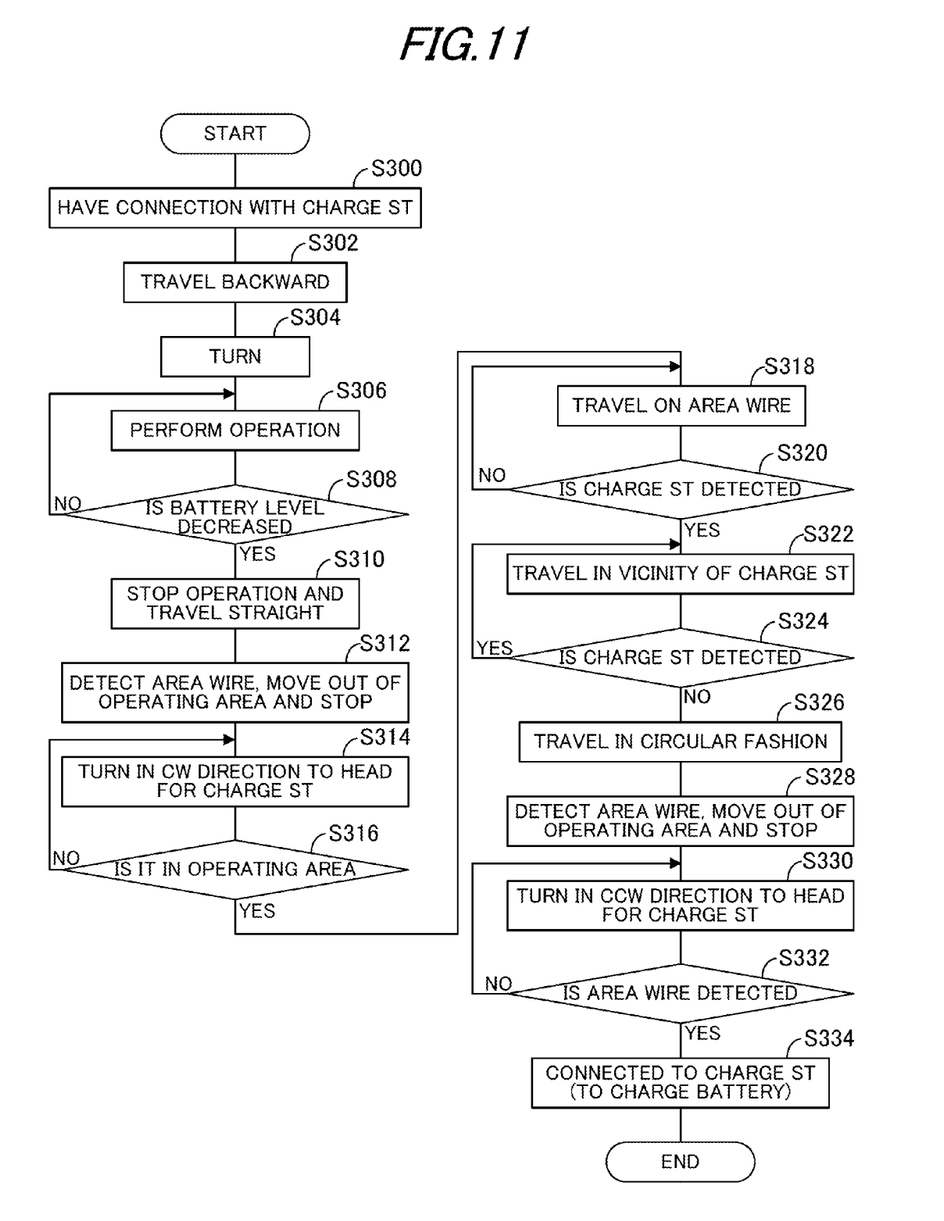
FIG. 11 is a flowchart showing the operation of the apparatus shown in FIG. 1, i.e., the operation in the case of applying a returning trajectory (4) shown in FIG. 4.

FIG. 11 is a flowchart corresponding to the returning trajectory (4) shown in FIG. 4.

The processes of the FIG. 11 flowchart are mostly the same as those of the FIG. 10 flowchart, i.e., the processes of S300 to S334 are conducted similarly to those of S200 to S242 in the FIG. 10 flowchart. As shown in FIG. 4, also in the case of applying the trajectory (4), the entering direction of the vehicle 10 when returning to the charge ST 74 is set as the CW.

As is clear from a comparison of the trajectories (3) and (4), the FIG. 11 flowchart for the trajectory (4) does not have the process of turning about conducted when the charge ST 74 is determined to be detected, which corresponds to S224 to S228. The remaining processes are the same as those of the FIG. 10 flowchart.

As stated above, the embodiment is configured to have an arrangement of an area wire (72) for an unmanned autonomous operating vehicle (10) having an electric motor (20) supplied with power from a battery (30) for operating an operating machine (16), prime movers (24) for driving wheels (14), and magnetic sensors (34) for detecting intensity of a magnetic field of the area wire, the vehicle being controlled to run about in an operating area (70) defined by the area wire through wheels driven by the prime movers to perform an operation using the operating machine and to return to a charging device (74) installed on the area wire so as to charge the battery, characterized in that: a charging device detecting area (76a) set to be used for detecting a position of the charging device; and a turn-back portion (72a) formed by bending the area wire at an appropriate position toward the charging device detecting area and again bending the area wire to return in a same direction with a predetermined space, whereby the operating area is divided into a plurality of zones.

With this, since the vehicle 10 can reach the charging device 84 through the turn-back portion 72a that is formed by bending the area wire 72 toward the charging device detecting area 76a and again bending it to return in the same direction, it becomes possible to shorten the running distance of the vehicle 10 when it is run to return to the charging device 84 to charge the battery 30 and it makes possible to perform the (mowing) operation to the limit of the battery 30, thereby improving the work efficiency. Further, since it is configured to only bend the area wire 72 locally and no additional device is needed, the structure can be simple.

In the arrangement, the predetermined space is determined based on the intensity of the magnetic field of the area wire. With this, in addition to the above effects, when the intensity of the magnetic field of the area wire 72 is detected to run on the area wire 72, it becomes possible to avoid a situation where the magnetic fields at two close points of the area wire 72 are canceled out and become undetectable, so that the vehicle's running is not adversely affected.

In the arrangement, the vehicle is controlled to turn about upon reaching the charging device detecting area and subsequently run toward the area wire to be guided to the charging device while detecting the intensity of the magnetic field of the area wire to return to the charging device (42, S120-S130, S222-S242, S324-S334). With this, in addition to the above effects, it becomes possible to reliably shorten the running distance of the vehicle 10 when it is run to return to the charging device 84 to charge the battery 30.

In the arrangement, an entering direction of the vehicle to the charging device is changed whenever the vehicle is to be returned to the charging device while detecting the intensity of the magnetic field of the area wire to return to the charging device (42, S24, S114, S214, S314). With this, in addition to the above effects, it becomes possible to prevent many tracks or grooves from being formed on the area wire 72, 72a by wheels 14 of the vehicle 10.

The embodiment is configured to have an apparatus for controlling an unmanned autonomous operating vehicle (10) having an electric motor (20) supplied with power from a battery (30) for operating an operating machine (16), a prime movers (24) for driving wheels (14), and magnetic sensors (34) for detecting intensity of a magnetic field of an area wire (72), the vehicle being controlled to run about in an operating area (70) defined by the area wire through wheels driven by the prime movers to perform an operation using the operating machine and to return to a charging device (74) installed on the area wire so as to charge the battery, characterized in that: a charging device detecting area (76a) set to be used for detecting a position of the charging device; a turn-back portion (72a) formed by bending the area wire at an appropriate position toward the charging device detecting area and again bending the area wire to return in a same direction with a predetermined space; and a returning controller (42, S120-S130, S222-S242, S324-S334) adapted to control the vehicle to turn about when the vehicle is determined to have reached the charging device detecting area and subsequently run toward the area wire to be guided to the charging device when the vehicle is to be returned to the charging device.

With this, since the vehicle 10 can reach the charging device 84 through the turn-back portion 72a that is formed by bending the area wire 72 toward the charging device detecting area 76a and again bending it to return in the same direction, it becomes possible to shorten the running distance of the vehicle 10 when it is run to return to the charging device 84 to charge the battery 30 and it makes possible to perform the (mowing) operation to the limit of the battery 30, thereby improving the work efficiency. Further, since it is configured to only bend the area wire 72 locally and no additional device is needed, the structure can be simple.

In the apparatus, the returning controller controls the vehicle to again turn about and subsequently run toward the area wire to be guided to the charging device when the vehicle is determined to have passed through the charging device detecting area after turning about (42, S230-S242). With this, in addition to the above effects, it becomes possible to reliably shorten the running distance of the vehicle 10 when it is run to return to the charging device 84 to charge the battery 30.

In the apparatus, the returning controller changes an entering direction of the vehicle to the charging device whenever the vehicle is to be returned to the charging device (42, S114, S214, S314). With this, in addition to the above effects, it becomes possible to prevent many tracks or grooves from being formed on the area wire 72, 72a by wheels 14 of the vehicle 10.

In the apparatus, the returning controller decreases a running speed of the vehicle when the vehicle is determined to have reached the charging device detecting area to return to the charging device (42, S32, S130, S242, S334). With this, in addition to the above effects, it becomes possible to surely connect the vehicle 10 to the charging device 84 to charge the battery 30.

In the apparatus, the returning controller controls the vehicle to go across the turn-back portion when the vehicle is controlled to run about through the wheels driven by the prime movers in the operating area, while being controlled to perform the operation by using the operating machine driven by the motor (42, S16, S106, S206, S306). With this, in addition to the above effects, it becomes possible to avoid affecting the (mowing) operation.

In the apparatus according to claim any of claims 5 to 9, wherein the predetermined space is determined based on the intensity of the magnetic field of the area wire. With this, in addition to the above effects, in the configuration that the intensity of the magnetic field of the area wire 72 is detected to run on the area wire 72, the running is not adversely affected.

In the apparatus, the prime movers comprise electric motors to be supplied with power from the battery. With this, in addition to the above effects, it becomes possible to reduce the noise compared to a case that an engine is employed.

In the apparatus, the operating machine (16) comprises a lawn mower. With this, in addition to the above effects, in the mowing operation in which the operating area 70 is required to have the good appearance after the operation, it becomes possible to prevent many tracks or grooves from being formed on the area wire 72, 72a by wheels 14 of the vehicle 10 and also avoid needlessly damaging the lawn.

In the apparatus, the vehicle has a charging terminal (32) at its front to be connectable with the charging device installed on the area wire. With this, it becomes possible to charge the battery 30 more easily.

In the apparatus, the charging device is disposed with a coil (76) radiating a magnetic field that forms a charging device detecting area around the charging device. With this, it becomes possible to detect the charging device (charge ST) 74.

It should be noted that, in the foregoing, although the electric motor is applied as the prime mover, it may be an internal combustion engine or a hybrid of an engine and electric motor.

It should also be noted that, although the lawn-mowing blades are exemplified as the operating machine, but it should not be limited thereto and any machine can be applied if it is used for maintaining the appearance of the operating area.

Japanese Patent Application No. 2012-027635, filed on Feb. 10, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an unmanned autonomous operating vehicle having an electric motor supplied with power from a battery for operating an operating machine, prime movers for driving wheels, and magnetic sensors for detecting intensity of a magnetic field of an area wire, the apparatus comprising:

a circular charging device detecting area set to be used for detecting a position of a charging device installed on the area wire, a center of the charging device detecting area being at the charging device;

a turn-back portion including a pair of bending wire portions facing each other, the pair of bending wire portions being formed by bending the area wire at a first position on an opposite side of the charging device across an operating area defined by the area wire toward the charging device detecting area and again bending the area wire at a second position within the charging device detecting area toward the first position, the pair of bending wire portions being separated from each other by a predetermined distance, an area between the pair of bending wire portions being outside the operating area so that the operating area is divided into two zones through the pair of bending wire portions; and a controller adapted to control the vehicle in an operating mode to run about in the operating area through the wheels driven by the prime movers to perform an operation using the operating machine while determining whether the vehicle is inside the operating area based on signals from the magnetic sensors to allow the vehicle to go across the area between the pair of bending wire portions based on a comparison of a time period that the vehicle is determined to be outside the operating area with a threshold value, and to control the vehicle in a return mode to turn about when the vehicle is determined to have reached the charging device detecting area and subsequently run toward the area wire to be guided to the charging device when the vehicle is to be returned to the charging device so as to charge the battery.

2. The apparatus according to claim 1, wherein the controller controls the vehicle in the return mode to again turn about and subsequently run toward the area wire to be guided to the charging device when the vehicle is determined to have passed through the charging device detecting area after turning about.

3. The apparatus according to claim 1, wherein the controller changes an entering direction of the vehicle to the charging device whenever the vehicle is to be returned to the charging device in the return mode.

4. The apparatus according to claim 1, wherein the controller decreases a running speed of the vehicle when the vehicle is determined to have reached the charging device detecting area to return to the charging device in the return mode.

5. The apparatus according to claim 1, wherein the controller controls the vehicle in the return mode to go across the turn-back portion when the vehicle is controlled to run about through the wheels driven by the prime movers in the operating area, while being controlled to perform the operation by using the operating machine driven by the motor.

6. The apparatus according to claim 1, wherein the predetermined distance is determined so that the magnetic sensors can detect a magnetic field generated around the turn-back portion based on the intensity of the magnetic field of the area wire.

7. The apparatus according to claim 1, wherein the prime movers comprise electric motors to be supplied with power from the battery.

8. The apparatus according to claim 1, wherein the operating machine comprises a lawn mower.

9. The apparatus according to claim 1, wherein the vehicle has a charging terminal at its front to be connectable with the charging device installed on the area wire.

10. The apparatus according to claim 1, wherein the charging device is disposed with a coil radiating a magnetic field that forms a charging device detecting area around the charging device.

* * * * *